(12) United States Patent
Worrall

(10) Patent No.: US 9,055,555 B2
(45) Date of Patent: *Jun. 9, 2015

(54) CELLULAR COMMUNICATION SYSTEM, NETWORK CONTROLLER AND METHOD FOR OBTAINING FEEDBACK FROM SUBSCRIBER COMMUNICATION UNITS

(71) Applicant: SONY CORPORATION, Minato-ku (JP)

(72) Inventor: Chandrika Kumudinie Worrall, Newbury (GB)

(73) Assignee: Sony Corporation, Tokyo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 13/668,856

(22) Filed: Nov. 5, 2012

(65) Prior Publication Data

US 2013/0064167 A1 Mar. 14, 2013

Related U.S. Application Data

(63) Continuation of application No. 11/888,645, filed on Jul. 31, 2007, now Pat. No. 8,310,919.

(30) Foreign Application Priority Data

Aug. 21, 2006 (GB) .................................. 0616526.0

(51) Int. Cl.
*H04J 3/14* (2006.01)
*H04W 72/00* (2009.01)
*H04L 12/18* (2006.01)

(52) U.S. Cl.
CPC ........... *H04W 72/005* (2013.01); *H04L 12/189* (2013.01)

(58) Field of Classification Search
USPC .............. 370/229, 230, 310, 310.2, 311, 312, 370/328, 349, 389, 390, 432
See application file for complete search history.

(56) References Cited

U.S. PATENT DOCUMENTS

2004/0146019 A1* 7/2004 Kim et al. ..................... 370/329
2005/0036455 A1* 2/2005 Bakker et al. ................. 370/312

(Continued)

FOREIGN PATENT DOCUMENTS

JP 2007-532022 11/2007
JP 5397486 B2 1/2014

(Continued)

OTHER PUBLICATIONS

Office Action issued Mar. 11, 2014 in Japanese Patent Application No. 2013-113947.

(Continued)

*Primary Examiner* — Kwang B Yao
*Assistant Examiner* — Nguyen Ngo
(74) *Attorney, Agent, or Firm* — Oblon, McClelland, Maier & Neustadt, L.L.P.

(57) ABSTRACT

A method for obtaining feedback from one or more wireless subscriber communication unit(s) related to a broadcast service in a wireless communication system comprising at least one communication cell. The method comprises transmitting a request message by a network controller to one or more wireless subscriber communication unit(s); receiving and processing the request message by a wireless subscriber communication unit; transmitting a layer-1 response signal by the wireless subscriber communication unit in response to the request message; and detecting by the network controller the layer-1 response signal in a particular communication cell, and in response thereto, performs one of the following:
(i) entering a point-to-multipoint broadcast mode of operation;
(ii) modifying a delivery of the broadcast service in that communication cell.

28 Claims, 10 Drawing Sheets

(56) References Cited

U.S. PATENT DOCUMENTS

| | | | |
|---|---|---|---|
| 2006/0056347 A1 | 3/2006 | Kwak et al. | |
| 2006/0107287 A1 | 5/2006 | Lee et al. | |
| 2006/0154680 A1* | 7/2006 | Kroth et al. | 455/515 |
| 2007/0071025 A1 | 3/2007 | Bergstrom et al. | |
| 2007/0117579 A1* | 5/2007 | Cai et al. | 455/509 |
| 2008/0045228 A1* | 2/2008 | Zhang et al. | 455/450 |
| 2008/0056347 A1* | 3/2008 | Chiu et al. | 375/240 |
| 2008/0311892 A1* | 12/2008 | Lee et al. | 455/414.1 |

FOREIGN PATENT DOCUMENTS

| | | |
|---|---|---|
| KR | 2005-55713 | 6/2005 |
| WO | WO 2004/100402 A1 | 11/2004 |
| WO | WO 2005/018268 A1 | 2/2005 |
| WO | WO 2005/101738 A1 | 10/2005 |
| WO | WO 2006/008820 A1 | 1/2006 |
| WO | WO 2006/031055 A1 | 3/2006 |
| WO | WO 2007/062297 | 5/2007 |

OTHER PUBLICATIONS

Office Action issued Jun. 25, 2013 in Japanese Application No. 2011-136073 (With English Translation).

Summons to Attend Oral Proceedings issued Apr. 26, 2013 in European Application No. 07787703.3.

Summons to Attend Oral Proceedings issued Apr. 26, 2013 in European Application No. 10169171.5.

Summons to Attend Oral Proceedings issued Apr. 26, 2013 in European Application No. 10169170.7.

Summons to Attend Oral Proceedings issued Apr. 26, 2013 in European Application No. 10169169.9.

Summons to Attend Oral Proceedings issued Apr. 26, 2013 in European Application No. 10169168.1.

Summons to Attend Oral Proceedings issued Apr. 26, 2013 in European Application No. 12151991.2.

Korean Office Action dated Aug. 14, 2012.

Office Action issued Oct. 4, 2011 in Japanese Patent Application No. 2009-524991 (with English translation).

3GPP TSG RAN WG2 ad-hoc Re16 (Philips), "Consideration for MBS Counting Procedures," cited in an Office Action dated Sep. 7, 2010, in corresponding European proceeding.

Great Britain Search Report mailed Dec. 1, 2006, for GB Application No. 0616526.0, filed Aug. 21, 2006, 4 page.

International Search Report from PCT Patent Application No. PCT/EP2007/057445 dated Dec. 20, 2007.

Communication Pursuant to Article 94(3) EPC from European Patent Application No. 07 787 703.3-2412, dated Jan. 28, 2010.

3GPP TSG-RAN-WG2 Meeting #53; CATT; Access Procedure in E-MBMS Counting Response; Shanghai, China, May 8-12, 2006.

ETSI TS 125 346 v7.1.0 (Jun. 2006) Universal Mobile Telecommunication Systems (UMTS); Introduction of the Multimedia Broadcast/Multicast Service (MBMS) in the Radio Access Network (RAN); State 2 (3GPP TS 25.345 version 7.1.0 Release 7).

Office Action issued Sep. 15, 2014 in Chinese Patent Application No. 201210399293.6 (with English translation).

Office Action issue Sep. 16, 2014 in Japanese Patent Application No. 2013-113947.

* cited by examiner

FIG. 1 - PRIOR ART

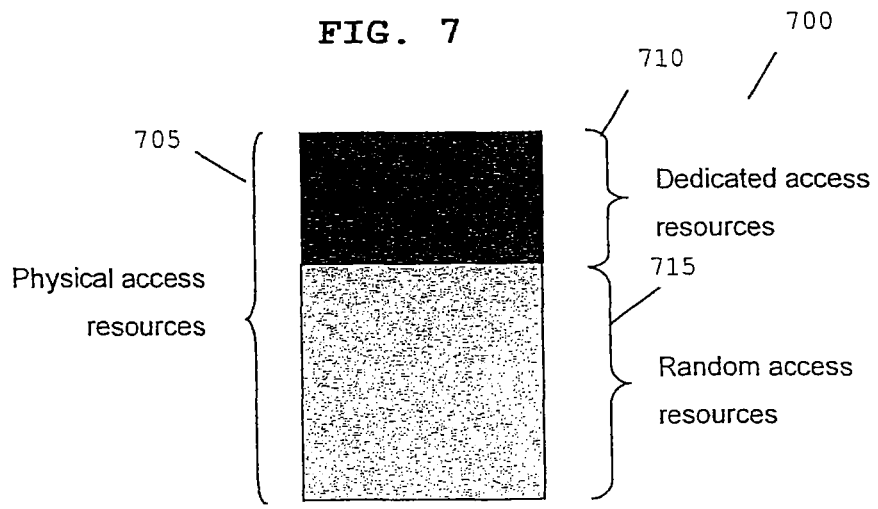
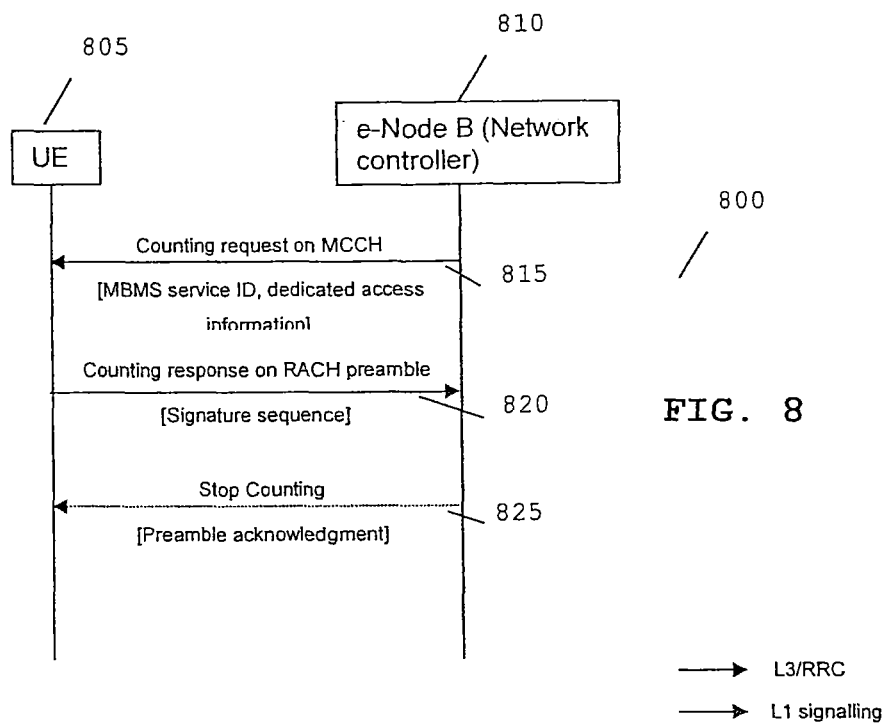

CELLULAR COMMUNICATION SYSTEM, NETWORK CONTROLLER AND METHOD FOR OBTAINING FEEDBACK FROM SUBSCRIBER COMMUNICATION UNITS

CROSS-REFERENCE TO RELATED APPLICATION

This application is a continuation of application Ser. No. 11/888,645, filed Jul. 31, 2007. U.S. application Ser. No. 11/888,645 claims the benefit of priority to United Kingdom Patent Application No. GB0616526.0 filed Aug. 21, 2006, the entire contents of which is incorporated herein by reference in its entirety.

FIELD OF THE INVENTION

This invention relates to communication system, apparatus and method for obtaining feedback related to broadcast and multicast transmissions. The invention is applicable to, but not limited to, obtaining feedback related to multimedia broadcast and multicast service (MBMS) activated users in an Evolved Universal Mobile Telecommunication System (UMTS) Terrestrial Radio Access Networks (E-UTRAN), which is currently being standardized in 3rd Generation Partnership Project (3GPP).

BACKGROUND OF THE INVENTION

As radio spectrum is at a premium, spectrally efficient transmission techniques are required in order to provide users with as many multimedia broadcast/multicast services as possible, thereby providing mobile phone users (often referred to as subscribers) with the widest choice of services. It is known that multimedia broadcast/multicast services may be carried over cellular networks, in a similar manner to conventional terrestrial television/radio transmissions.

In order to provide enhanced communication services, the 3rd generation cellular communication systems are designed to support a variety of different and enhanced services. One such enhanced service is multimedia broadcast and multicast services (MBMS). The demand for multimedia services that can be received via mobile phones and other handheld devices is set to grow rapidly over the next few years. Multimedia services, due to the nature of the data content that is to be communicated, require a high bandwidth.

Technologies for delivering multimedia services over cellular systems, such as the Mobile Broadcast and Multicast Service (MEMS) for UMTS, have been developed over the past few years. Examples of MBMS services and applications include multimedia broadcast, i.e. mobile TV, audio, video, etc.

In order to achieve efficient transmission, two delivery modes have been defined for MEMS delivery in 3GPP mobile communication system. The typical and most cost-effective approach in the provision of multimedia services is to 'broadcast' the multimedia signals, as opposed to send the multimedia signals in an uni-cast (i.e. point-to-point) manner, where a dedicated radio bearer to a particular UE is provided. MBMS technology is designed to transmit data traffic from a content server (often referred to as a data source) to multiple destination user terminals (UEs) in a cellular/mobile communication system. Thus, typically, tens of channels carrying say, news, movies, sports, etc. may be broadcast simultaneously over a communication network.

The decision of the delivery mode is made at a network controller based on the number of users that have activated the service in the coverage area of the network controller. If the number of UEs that have activated the service is larger than a pre-set threshold value, p-t-m transmission is selected and used. Otherwise, the service is delivered over the p-t-p radio bearers. This is done in order to optimise the efficiency of delivering the MBMS data content according to the number of participating users. In some instances, the selection may be made on the potential interest in a particular service, i.e. the network controller asks served UEs whether they are interested in a particular MBMS service, and dependent upon the response, a (p-t-p or p-t-m) transmission delivery mode is selected. Thus, if the number of users interested in a service is less than a pre-set threshold value, then p-t-p mode is used as this is more radio efficient. However, the pre-set threshold value is mainly a function of the radio technology employed, and in most practical deployment scenarios is typically arranged to be less than two or three users in a cell.

The selection of a delivery mode for a MBMS service in a coverage area is termed "counting" procedure. The network controller initiates a counting procedure by sending a counting request message in a downlink (DL) channel over the Main Control Channel (MCCH). Notably, Layer-3 signally is used for the communication between the network controller and the UE during the counting procedure. Once a UE detects that the counting procedure is on-going for the specific MBMS service that the UE has activated, the UE replies to the counting request by sending a counting response message over the random access channel (RACH) to the network controller. As there may be many users who have activated (or are interested in) a particular service in a cell, the number of simultaneous counting replies over a RACH may overload the RACH resources. This also impacts the RACH access by other (non-MEMS) users, which is problematic in the efficient provision of resources.

The RACH is a contention-based access channel, where the physical channel resources to be used for RACH is defined by the network and broadcast in the cell together with System Information. Thus, the RACH channel information is known to a UE in a system. When the UE needs to communicate to the network, whilst the UE has not been assigned dedicated resources to be used by the network, the UE uses a RACH channel. Hence, the UE access on RACH is random and may result in UE collisions/contention on RACH channel.

To avoid the congestion on the RACH due to a large number of counting responses, the network controller may perform access control during the counting procedure in the UMTS Terrestrial Radio Access Network (UTRAN). This uses an access prioritisation mechanism with use of an access probability factor. If the access probability factor is large, the UE has a higher chance of RACH access for submitting a counting response. Thus, the access probability factor is transmitted to the UE, together with the counting request message over MCCH. All UEs read the MCCH. Two different access probability factors are defined as:
  (i) access probability_factor_idle (as used by the idle state UEs); and
  (ii) access_probability_factor_connected (as used by the connected state UEs (i.e. those active on URA_PCH, CELL_PCH or CELL_FACH state).

The counting response message also takes two forms, dependent upon the UE state (i.e. RRC_connected or RRC_Idle). The RRC_Idle state UEs have no connection to the network and reply to the counting request by establishing a radio resource connection (RRC) with the establishment cause (indication) set to 'MBMS reception'. The RRC_Connected UEs have connection to the network and are therefore configured to send a cell update message with the establishment cause (indication) also set to 'MBMS reception.

Thus, depending on their state, both connected and Idle UEs use either access_probability_factor_idle or access_probability_factor_connected for RACH access. Normally, access_probability_factor_connected provides a higher probability of access (due to the connected state UEs already being connected to the network and therefore able to send a quicker response to the network) than access_probability_factor_idle.

Referring now to FIG. 1, the known mechanism for allocating MBMS resources to a UE 150 from a Radio Network Controller (RNC) 102 via a Node-B in UMTS is illustrated. The RNC 102 and Node-B are illustrated as comprising a number of logic elements that can handle signalling at various levels of the well known OSI model, for example: Layer-1 air-interface signalling 112, Layer-2 medium access control signalling 110, Layer-2 resource link control 108 and Layer-3 signalling 106. Similarly, the UE 150 comprises logic elements that can handle signalling at various levels of the well known OSI model at the subscriber end of the communication link, for example: Layer-1 air-interface signalling 152, Layer-2 medium access control signalling 154, Layer-2 resource link control 156 and Layer-3 signalling 158. The various layers used for signalling communication are self explanatory from FIG. 1, and will thus not be described further here.

The known process starts with the radio resource management (RRM) 104 making a decision to commence a counting operation 100 for a particular MEMS service by sending an instruction 116 to Layer-3 signalling. A RRC-counting request (RRC-CR) message 118 is followed by a RRC-CR message on the MCCH 120 and in turn by an RRC-CR message on the MBMS transport channel (MCH) 122.

An RRC-CR message 124 is then transmit across the air-interface to the UE 150, where it is received and processed. The air-interface (Layer-1) signalling message is converted into a RRC-CR message 160 on the MCH, and in turn an RRC-CR message 162 on the MCCH (MBMS control channel). Following receipt of the Layer-3 RRC-CR message 164 in the UE, a decision 166 on whether the UE is interested in the counting procedure can be made.

In response, the UE initiates a Layer-3 RRC-connection request (RRC-CoR) message 168, in turn followed by Layer-2 RRC-CoR messages 170, 172 requesting a RACH access 175. An RRC-CoR message 176 is then sent to Layer-1 signalling on the RACH and an air-interface RRC-CoR message 126 sent to the network controller 102. The network controller 102 receives the air-interface RRC-CoR message 126 and processes this via Layer-2 RRC-CoR message 128 on the CCCH and Layer-2 RRC-CoR message 130, with an admission control message 132 to admission control logic 134 in the RRM 104.

The admission control 134 in the RRM 104 sends an instruction 136 to Layer-3 signalling. A RRC-connection setup (RRC-CS) message 138 is followed by a RRC-CS message on the dedicated control channel DCCH 140, and in turn by an RRC-CS message on the dedicated transport channel (DCH) 142.

An RRC-CS message 178 is then transmit across the air-interface to the UE 150, where it is received and processed. The air-interface (Layer-1) signalling message is converted into a RRC-CS message 180 on the DCH, and in turn an RRC-CS message 182 on the DCCH. Following receipt of the Layer-3 RRC-CS message 184 in the UE, the UE sets up the radio bearer as instructed by the network (within RRC-CS) and initiates a Layer-3 RRC-connection setup complete (RRC-CC) message 185, in turn followed by Layer-2 RRC-CC messages 190, 192. An air-interface RRC-CC message 194 is sent to the network controller 102. The network controller 102 receives the air-interface RRC-CC message 194 and processes this via Layer-2 RRC-CC messages 144, 146 on the DCH and DCCH and Layer-2 RRC-CC message 148 to the RRM 104.

Thus, as illustrated, the known counting procedure used in the UTRAN is complex and requires a large amount of signalling between the UEs and the network controller over the radio air-interface. This results in inefficient radio resource utilisation.

One problem with the aforementioned complex procedures emanates from the fact that the counting procedure used in the UTRAN is designed to determine the transmission mode (between point-to-point (p-t-p) and point-to-multipoint (p-t-m)) of MBMS service based on the number of users in a given cell. Therefore, it is necessary to indicate accurately whether the number of users in the cell is larger than a pre-set threshold value, in order for the network controller to switch to or from p-t-m mode to continually optimise use of resources.

The use of p-t-p transmission mode not only increases the MBMS provision complexity, but also has limited or even non-existent performance gain over p-t-m mode in most of the practical deployment scenarios. This is particularly the case, in orthogonal frequency division multiple access (OFDMA) based Single Frequency Networks (SFN), which are currently being standardised in 3GPP for next generation communication system (Evolved UMTS Terrestrial Radio Access Networks, E-UTRAN).

E-UTRAN employs a single frequency network, where all the base stations are time synchronous. Hence, the same signal can be transmitted from a number of cells in a service area. The service area may contain more than one cell. The transmission of the same signal from time synchronised cells results in over-the air combining of the signal, thus increasing the received signal energy and hence providing better reception at the UE.

Consequently, current techniques are suboptimal. Hence, an improved mechanism to address the problem of supporting broadcast transmissions over a cellular network would be advantageous. In particular, a system allowing for the provision of broadcast transmissions in an UTRA TDD system to co-exist with the existing UTRA-TDD system would be advantageous.

SUMMARY OF THE INVENTION

Accordingly, the invention seeks to mitigate, alleviate or eliminate one or more of the abovementioned disadvantages singly or in any combination.

According to a first aspect of the invention, there is provided a method for obtaining feedback from one or more wireless subscriber communication unit(s) related to a broadcast service in a wireless communication system comprising at least one communication cell. The method comprises transmitting a request message by a network controller to one or more wireless subscriber communication unit(s); receiving and processing the request message by a wireless subscriber communication unit; transmitting a layer-1 response signal by the at least one wireless subscriber communication unit in response to the request message; and detecting by the network controller the layer-1 response signal in a particular communication cell, and in response thereto performs one of the following:
(i) entering a point-to-multipoint broadcast mode of operation;

(ii) modifying a delivery of the broadcast service in that communication cell.

Advantageously, the aforementioned method may provide a simple low complexity procedure to detect MEMS activated users in a cell for only a very small amount of additional signalling traffic. Hence, the method may provide a method of utilising radio resources more efficiently.

The aforementioned method may provide a simple low complexity procedure of receiving the user feedback. Based on the feedback, the service delivery may be modified such that to support the provision of multimedia service to multiple users with satisfied perceptual quality.

According to an optional feature of the invention, the dedicated access information may comprise a dedicated signature sequence to be used for a counting response.

According to an optional feature of the invention, the request message may be transmitted by the network controller to identify whether one or more wireless subscriber communication unit(s) is receiving or is interested in receiving a broadcast service. A layer-1 response signal is transmitted by the wireless subscriber communication unit in response to the request message if it is receiving or is interested in receiving the broadcast service.

According to an optional feature of the invention, the layer-1 response signal may comprise a layer-1 response signal transmitted on a preamble part of the non-synchronous RACH. The non-synchronous RACH may be randomly selected from a set of specified RACH resources.

In this manner, the method may provide a common procedure for both idle and connected state UEs in an E-UTRAN implementation.

According to an optional feature of the invention, the dedicated access information may comprise a probability factor. The method may further comprise transmitting the probability factor from the network controller to the plurality of wireless subscriber communication units in the request message and selecting the non-synchronous RACH in response thereto.

In this manner, the procedure may not create a significant uplink load. Furthermore, the procedure may avoid creating congestion on RACH and therefore may not affect other RACH users.

According to an optional feature of the invention, the dedicated access information may be encrypted or protected, such that only a wireless subscriber communication unit interested in the multicast/broadcast service is able receive the dedicated access information.

In this manner, the method may provide protection against any possible radio resource attacks.

According to an optional feature of the invention, the network controller may transmit an acknowledgment, in response to receiving the layer-1 response signal.

According to an optional feature of the invention, time multiplexing a plurality of layer-1 multiple response signals between a plurality of broadcast services may be employed.

According to an optional feature of the invention, the layer-1 response signal may be transmitted by the wireless subscriber communication unit in response to the request message if the wireless subscriber communication unit is receiving too weak a signal to decode a subscribed-to broadcast service.

According to an optional feature of the invention, the communication system is a $3^{rd}$ Generation Partnership Project (3GPP) cellular communication system. The communication system is an Orthogonal Frequency Division Multiple Access (OFDMA) based Evolved-UTRAN cellular communication system.

According to a second aspect of the invention, there is provided a cellular communication system comprising at least one communication cell; and one or more wireless subscriber communication unit(s) operational in the at least one communication cell and arranged to receive signals from at least one network controller. The at least one network controller is arranged to transmit a request message to the one or more wireless subscriber communication unit(s). At least one wireless subscriber communication unit receives and processes the request message and transmits a layer-1 response signal in response to the request message; and the network controller detects the layer-1 response signal in a particular communication cell, and in response thereto performs one of the following:

(i) entering a point-to-multipoint broadcast mode of operation;

(ii) modifying a delivery of the broadcast service in that communication cell.

According to a third aspect of the invention, there is provided a cellular network controller comprising a transceiver; and processing logic operably coupled to the transceiver and arranged to transmit a request message to one or more wireless subscriber communication units. The transceiver is arranged to receive and process a layer-1 response signal in response to the request message from a particular communication cell, and in response thereto performs one of the following:

(i) entering a point-to-multipoint broadcast mode of operation;

(ii) modifying a delivery of the broadcast service in that communication cell

According to a fourth aspect of the invention, there is provided a wireless subscriber communication unit comprising a transceiver arranged to receive a request message from a network controller; and processing logic operably coupled to the transceiver and arranged to process the request message. The transceiver is arranged to transmit a layer-1 response signal in response thereto and receive a broadcast transmission in response to the transmission of the layer-1 response signal.

These and other aspects, features and advantages of the invention will be apparent from, and elucidated with reference to, the embodiment(s) described hereinafter.

Figure 1:
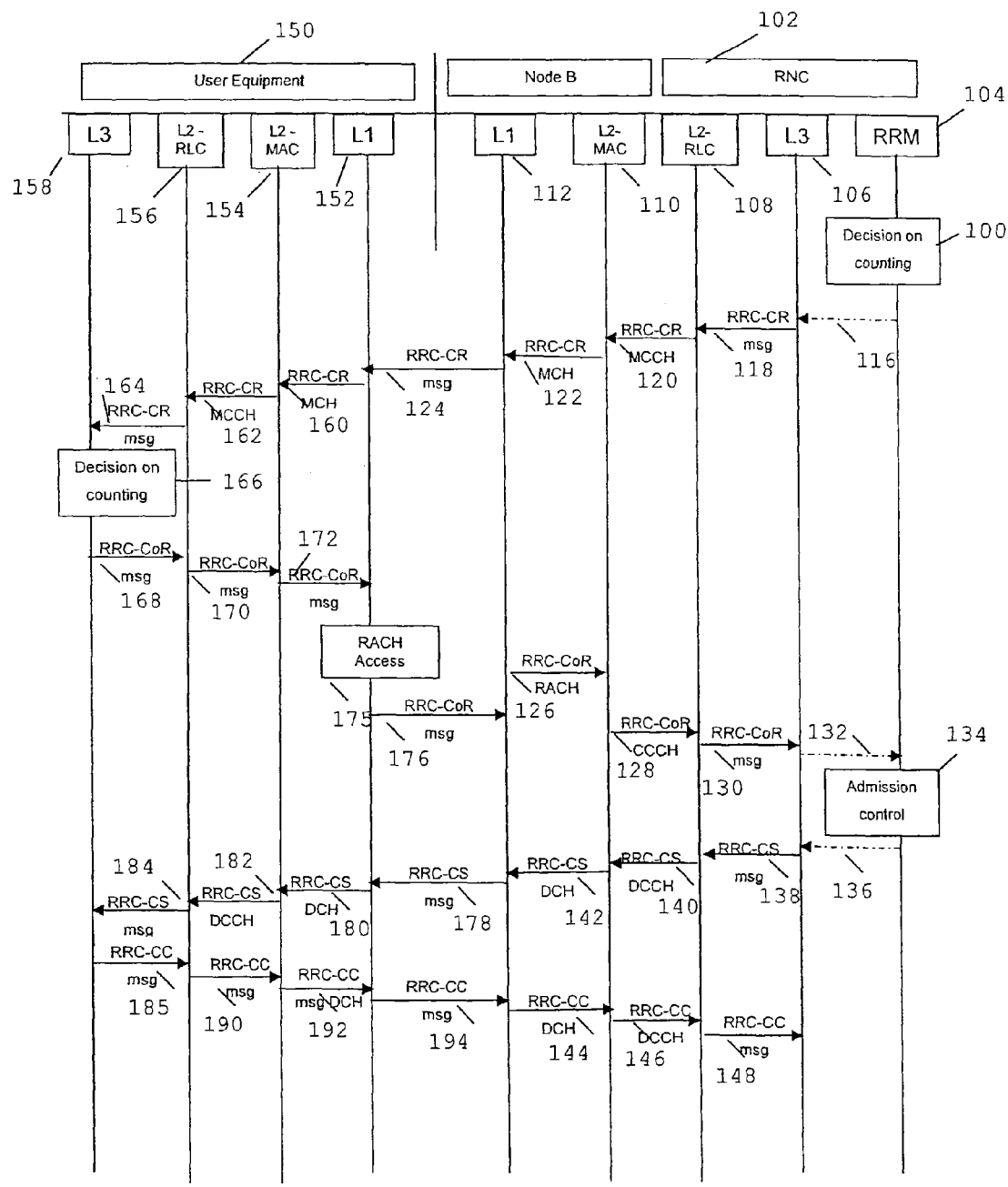
FIG. 1 illustrates a known mechanism for counting procedure in UMTS.
Figure 2:
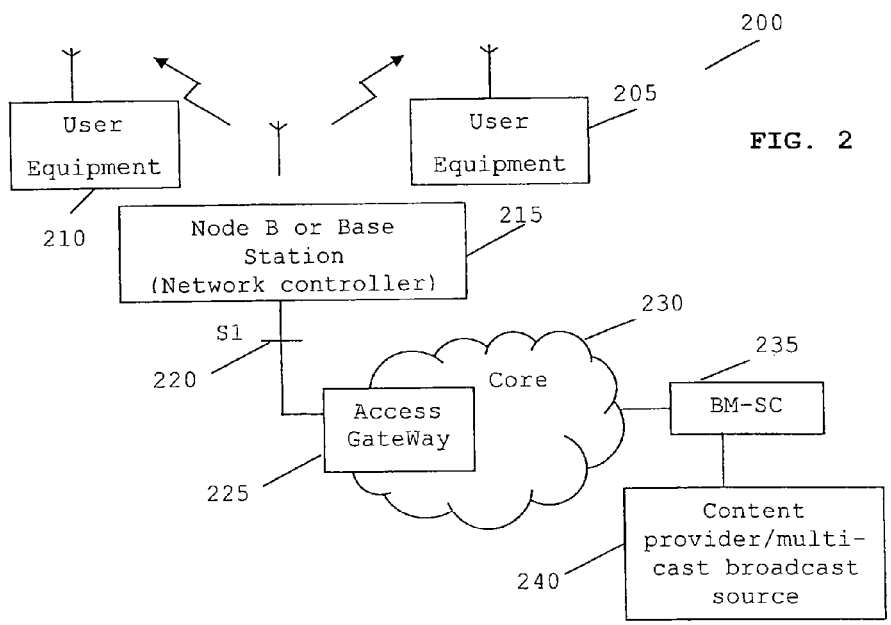
Figure 3:
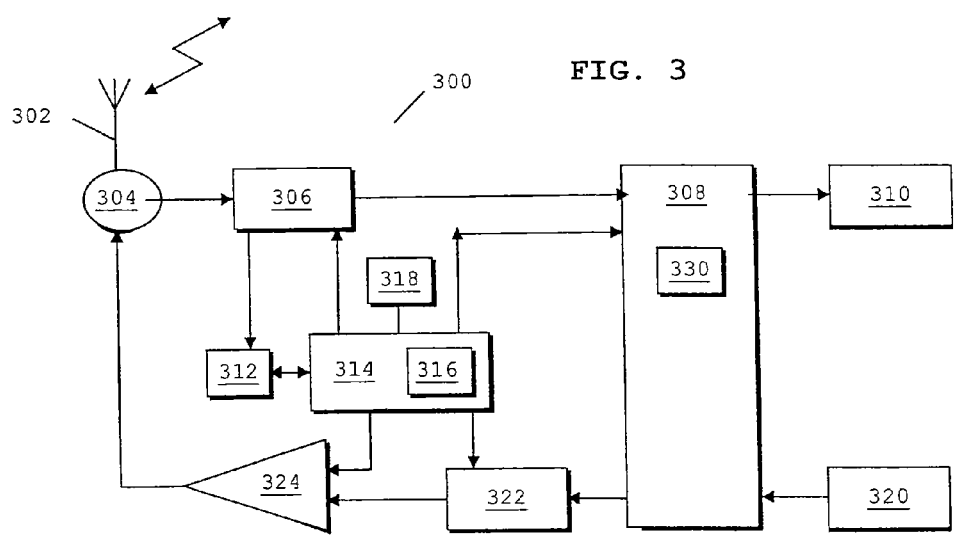
Figure 4:
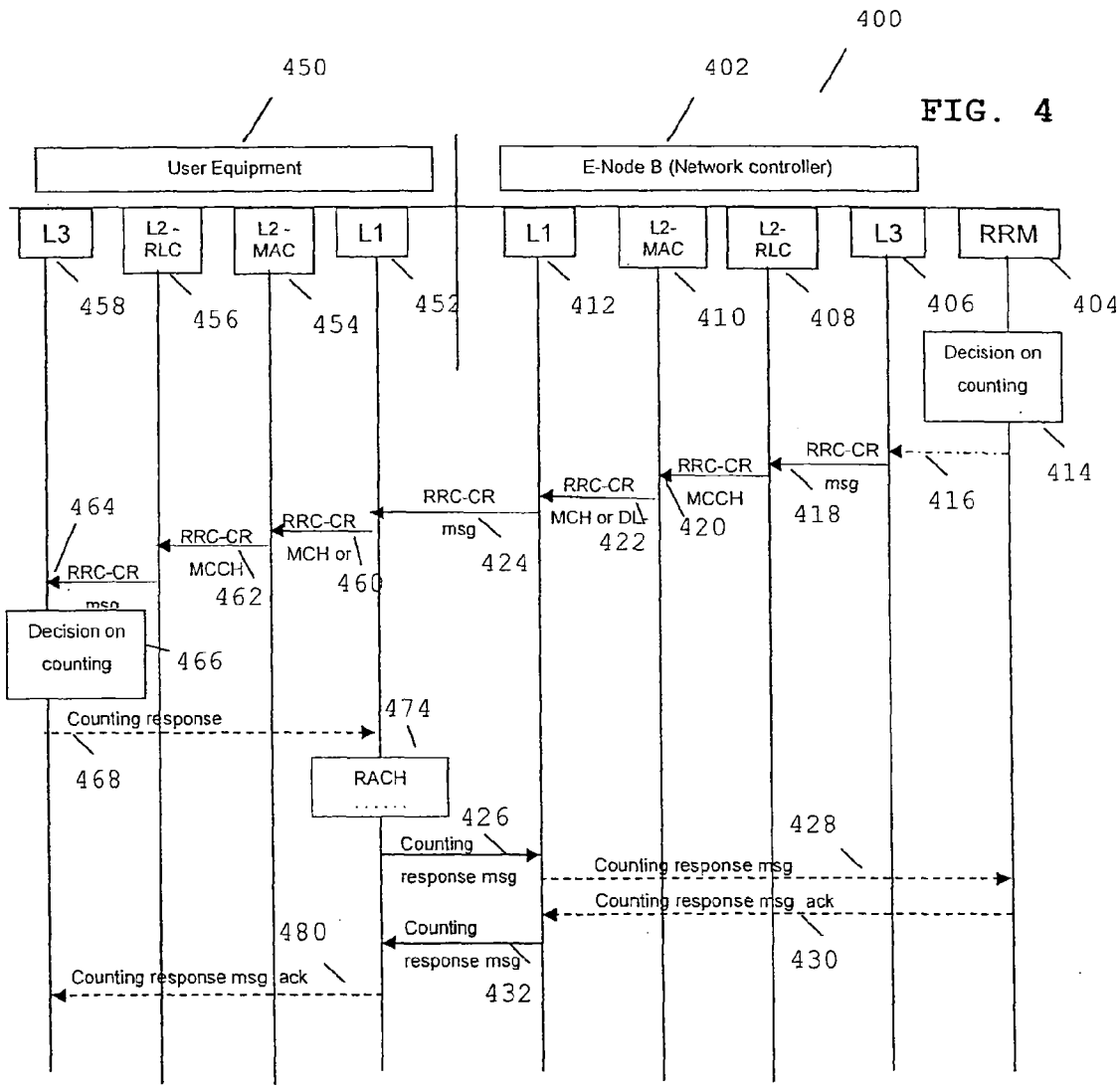
Figure 5:
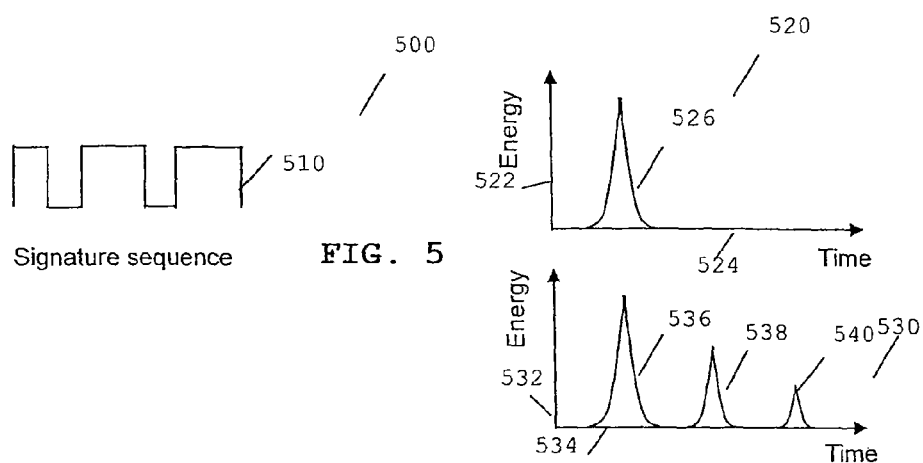
Figure 6:
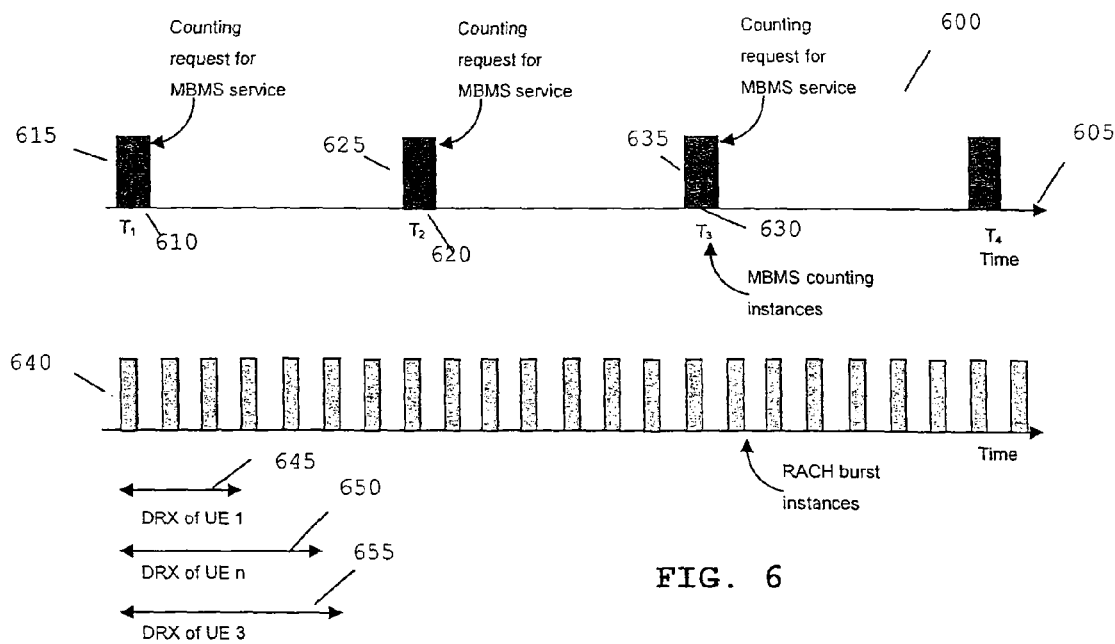
Figure 9:
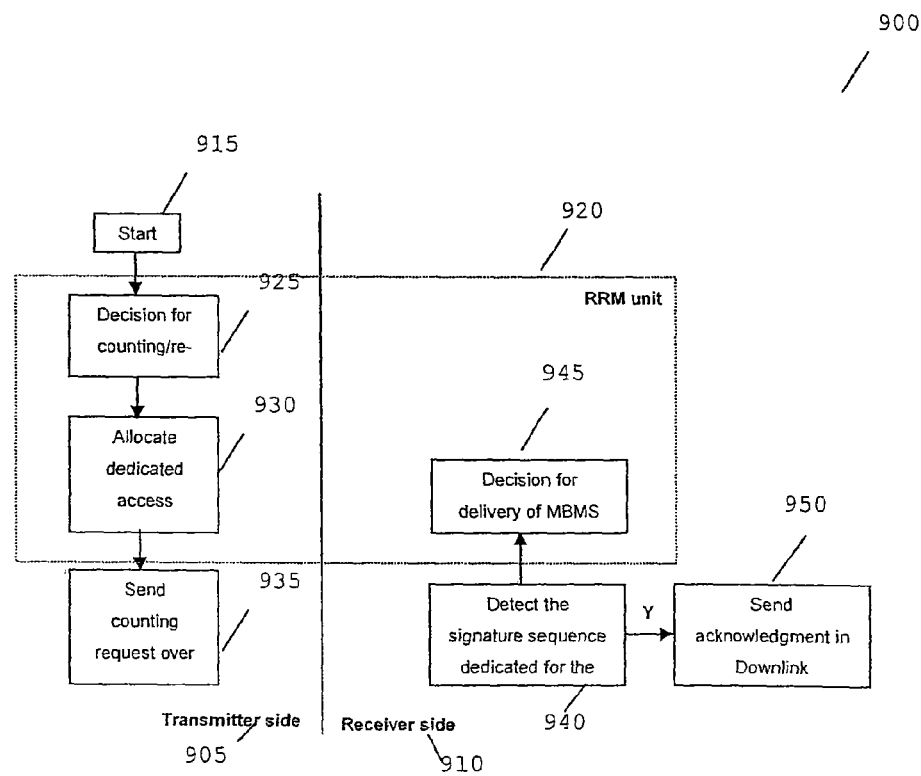
Figure 10:
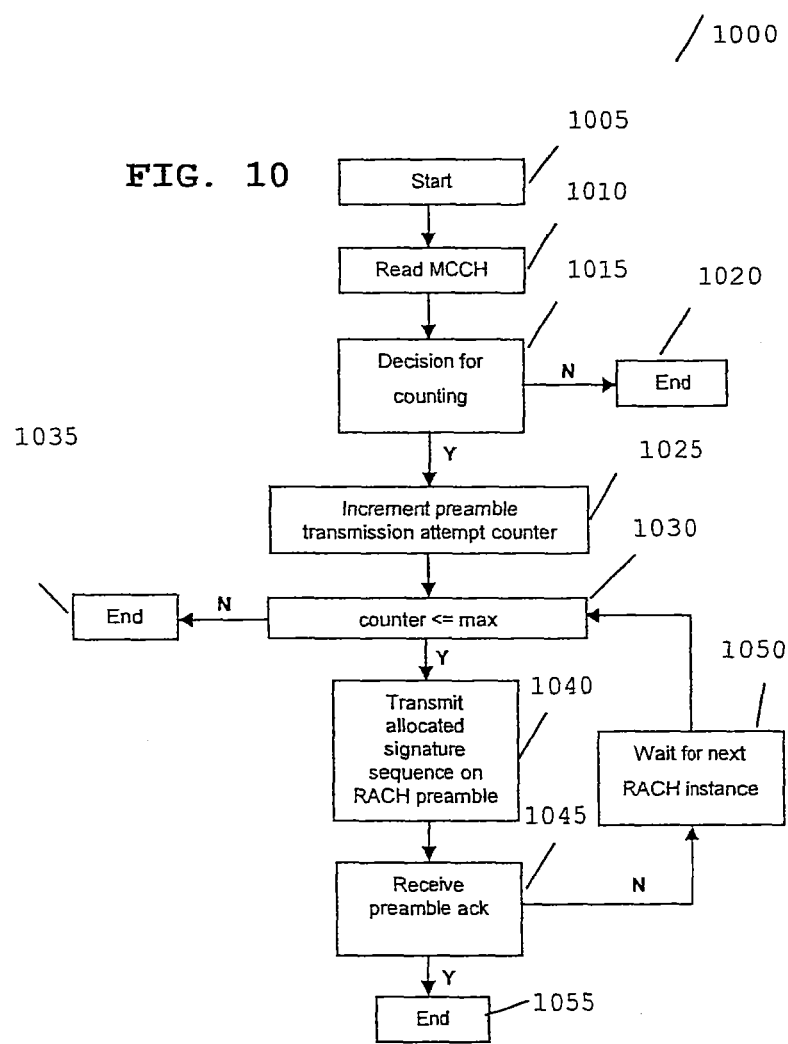
Figure 11:
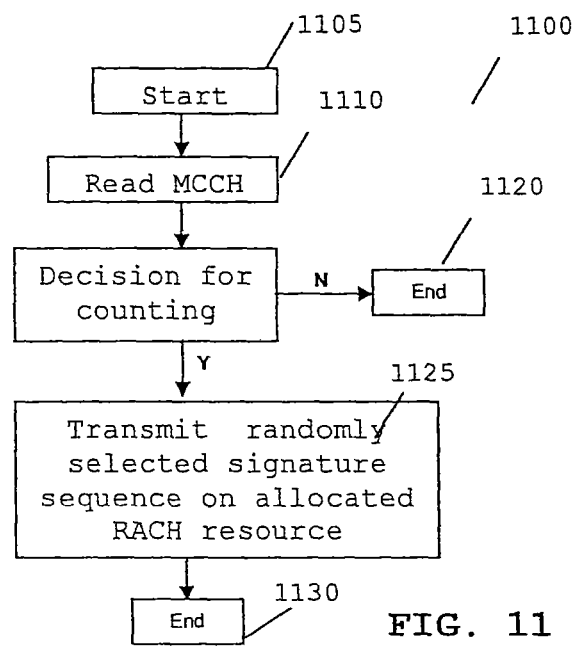
Figure 12:
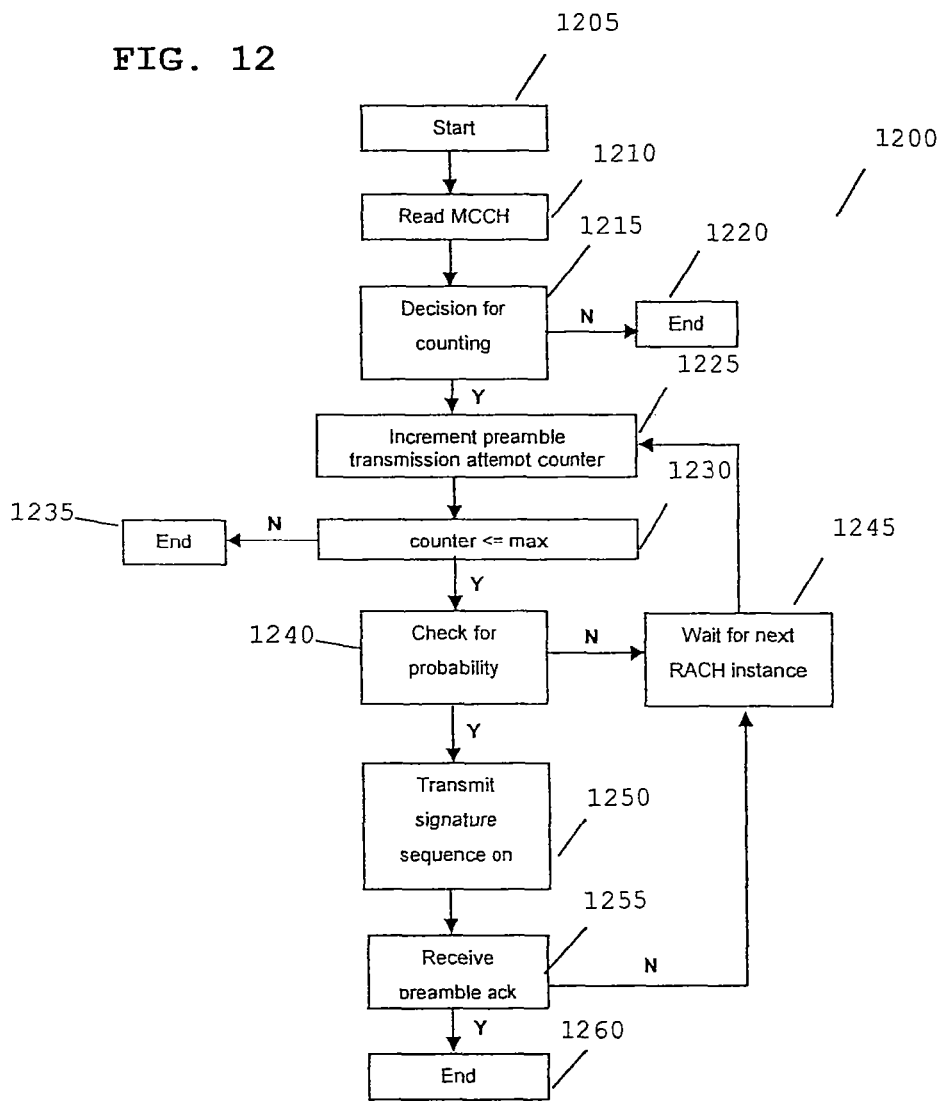

Embodiments of the invention will be described, by way of example only, with reference to the accompanying drawings, in which:

FIG. 2 illustrates a 3GPP cellular communication system adapted in accordance with some embodiments of the present invention;

FIG. 3 illustrates wireless communication unit adapted in accordance with some embodiments of the present invention;

FIG. 4 illustrates a mechanism for detecting MBMS activated users in an E-UTRAN, in accordance with some embodiments of the present invention;

FIG. 5 illustrates graphically a mechanism for detecting energy at a receiver in accordance with some embodiments of the present invention;

FIG. 6 illustrates an example of time multiplexing of signature sequence between MBMS services in accordance with some embodiments of the present invention;

FIG. 7 illustrates a physical access resource pool used in accordance with some embodiments of the present invention;

FIG. 8 illustrates a signalling flow seen in the counting procedure in accordance with some embodiments of the present invention;

FIG. 9 illustrates network controller behaviour in accordance with some embodiments of the present invention;

FIG. 10 illustrates a flowchart of UE behaviour in accordance with some embodiments of the present invention;

FIG. 11 illustrates a flowchart of UE behaviour in accordance with some embodiments of the present invention; and FIG. 12 illustrates a flowchart of UE behaviour in accordance with some embodiments of the present invention.

Figure 13:
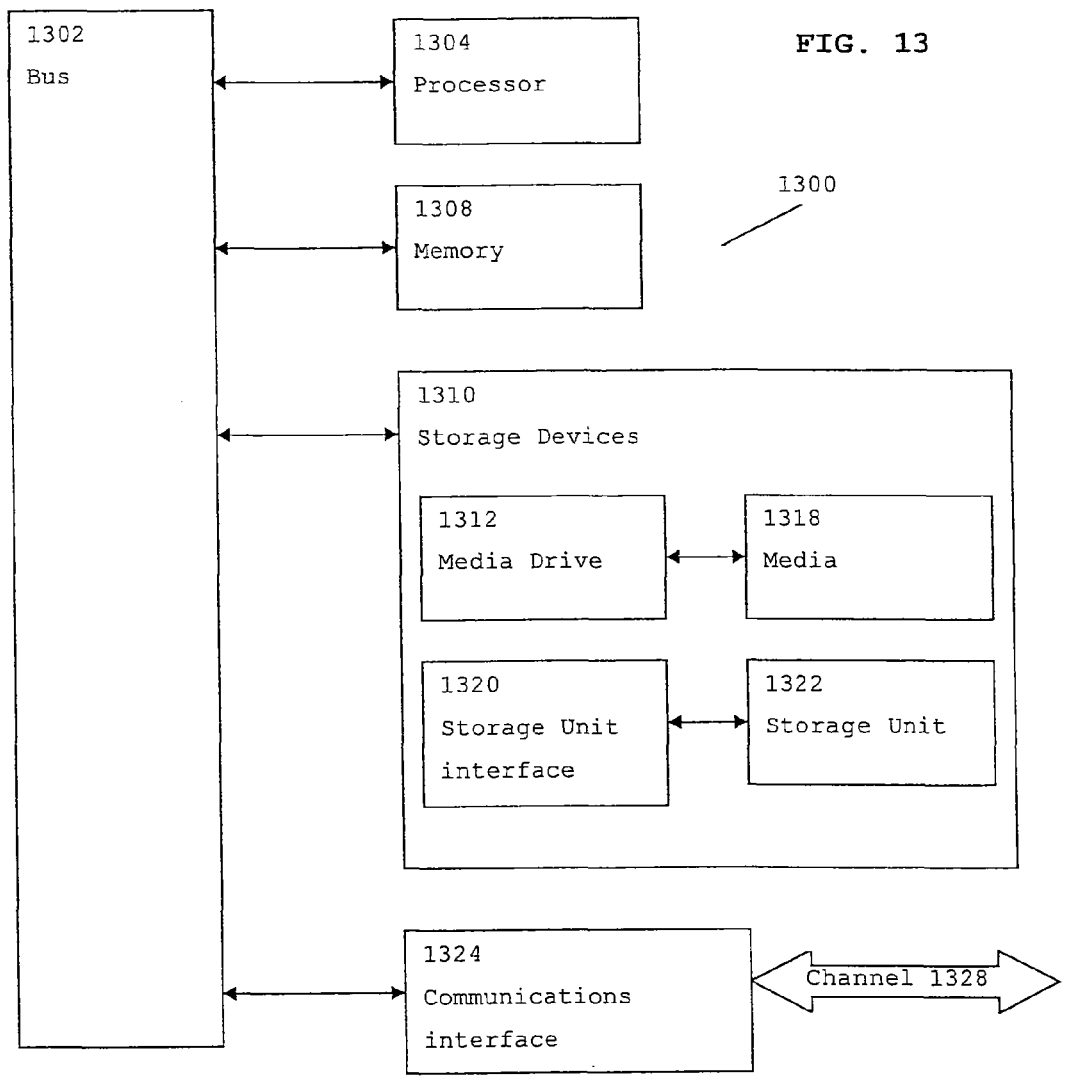

FIG. 13 illustrates a typical computing system that may be employed to implement processing functionality in embodiments of the invention.

DETAILED DESCRIPTION OF EMBODIMENTS OF THE INVENTION

The following description focuses on embodiments of the invention applicable to an Evolved UMTS (Universal Mobile Telecommunication System) cellular communication system and in particular to an E-UTRAN (Evolved UMTS Terrestrial Radio Access Network) of a $3^{rd}$ generation partnership project (3GPP) system. However, it will be appreciated that the invention is not limited to this particular cellular communication system, but may be applied to other cellular communication systems.

Therefore, the inventor of the present invention has recognised and appreciated that the provision of a counting procedure by the network controller may not be necessary for the determination of the selection of, or transition between, p-t-p and p-t-m transmission modes. However, the inventor of the present invention has also recognised and appreciated that a simplified counting procedure is necessary to detect whether there are any recipients in a given cell. Thus, the inventive concept herein described allows significantly more efficient transmission of localized MBMS services in cases when the recipient population is sparse, as the data does not need to be transmitted in 'empty' cells.

In the context of the present invention, the term 'broadcast service', hereinafter used, is meant to encompass both of the following definitions of service, as defined in the UMTS specification:

(i) Broadcast Service: a unidirectional point-to-point service in which data is efficiently transmitted from a single source to multiple UEs in the associated broadcast service area. Broadcast services may be received by all users who have enabled the specific broadcast service locally on their UE and who are in the broadcast area defined for the service.

(ii) Multicast service: a unidirectional point-to-multipoint service in which data is efficiently transmitted from a single source to a multicast group in the associated Multicast service area. A Multicast service may only be received by such users that are subscribed to the specific multicast service and have joined the multicast group associated with the specific service.

Thus, to receive a broadcast service, the user needs to activate the reception at the UE. In order to receive a multicast service, the user needs to join the service group.

Referring first to FIG. 3, a block diagram of a wireless communication unit (often referred to as a mobile subscriber unit (MS) in the context of cellular communications) is shown, in accordance with a preferred embodiment of the invention.

The MS 300 contains an antenna 302 preferably coupled to a duplex filter or antenna switch 304 that provides isolation between receive and transmit chains within the MS 300.

The receiver chain, as known in the art, includes receiver front-end circuitry 306 (effectively providing reception, filtering and intermediate or base-band frequency conversion). The front-end circuitry 306 is serially coupled to a signal processing function 308. An output from the signal processing function 308 is provided to a suitable output device 310, such as a screen or flat panel display. The receiver chain also includes received signal strength indicator (RSSI) circuitry 312, which in turn is coupled to a controller 314 that maintains overall subscriber unit control. The controller 314 may therefore receive bit error rate (BER) or frame error rate (FER) data from recovered information. The controller 314 is also coupled to the receiver front-end circuitry 306 and the signal processing function 308 (generally realised by a digital signal processor (DSP)). The controller is also coupled to a memory device 316 that selectively stores operating regimes, such as decoding/encoding functions, synchronisation patterns, code sequences, RSSI data, direction of arrival of a received signal and the like.

In accordance with the preferred embodiment of the invention, the memory device 316 stores configuration/profile information, as required in SMS form by the MS 300 and processed by signal processing function 308. Furthermore, a timer 318 is operably coupled to the controller 314 to control the timing of operations (transmission or reception of time-dependent signals) within the MS 300, particularly with regard to transmitting and/or responding to SMS configuration messages, either automatically or in response to user input.

As regards the transmit chain, this essentially includes an input device 320, such as a keypad, coupled in series through transmitter/modulation circuitry 322 and a power amplifier 324 to the antenna 302. The transmitter/modulation circuitry 322 and the power amplifier 324 are operationally responsive to the controller 314, and as such are used in transmitting of 2-way SMS messages/requests used in the configuration of the MS 300.

The signal processor function 308 in the transmit chain may be implemented as distinct from the processor in the receive chain. Alternatively, a single processor 308 may be used to implement processing of both transmit and receive signals, as shown in FIG. 3. Clearly, the various components within the MS 300 can be realised in discrete or integrated component form, with an ultimate structure therefore being merely an application-specific or design selection.

In accordance with the preferred embodiment of the present invention, receiver front-end circuitry 306, together with, and under the control and guidance of, the signal processing function 308, memory device 316, timer function 318 and controller 314 have been adapted to receive and process 2-way SMS messages/requests in the configuration of the MS 300.

Furthermore, in accordance with the preferred embodiment of the present invention, the transmitter/modulation circuitry 322, together with, and under the control and guidance of, the signal processing function 308, memory device 316, timer function 318 and controller 314 have been adapted to process and transmit 2-way SMS messages in the configuration of the MS 300.

Advantageously, embodiments of the present invention propose using Layer-1 signalling for the counting procedure used in MBMS. More specifically, embodiments of the present invention propose using a preamble part of non-synchronised RACH as a means of sending a counting response message by the users who are interested in a particular MBMS service. As a consequence of using Layer-1 signalling, the UE is not required to establish a connection to the network. Hence, the described procedure reduces the signalling delay, signalling overhead and may be applied without regard to the UE connection states to the network.

In one embodiment, the counting procedure may be understood as a user feedback (response) for an action request by the network. Here, the network requests users to inform the network (controller) of their intention to receive a particular MBMS service. The interested users transmit their intention of receiving the service implicitly within the Layer-1 message (i.e. implicitly within the preamble part of, say, a non-synchronised RACH channel). Thus, the procedure may generally be described as a Layer-1 signalling-based user feedback mechanism.

Although the invention is described with regard to Evolved UMTS Terrestrial Radio Access Networks (E-UTRAN), on which activity on standardisation is ongoing in 3GPP, it is contemplated that the methods described in the present invention may be applied whenever it is desired to detect interested or activated users for particular MEMS service in any cellular communication system.

In one embodiment of the present invention, the network controller is required to initiate a counting procedure by sending a counting request message over. MCCH or similar MBMS-related control channel. The counting response message is sent by the interested UEs over non-synchronised random access (RACH) channel. Note that two types of RACH are defined for an E-UTRAN system. A synchronised RACH incorporates a preamble followed by a message payload. In non-synchronised RACH, only a signature sequence is sent over the preamble part. In non-synchronised RACH, the UE is not uplink time synchronised to the network controller, whilst in synchronised RACH the UE is time synchronised with the network controller.

In one embodiment of the present invention, both idle mode UEs and connected mode UEs are able to access non-synchronised RACH, whenever necessary.

The preamble part, which carries the signature sequence, is transmitted over RACH burst. The RACH burst is defined by physical resources in terms of time and frequency in the Single Carrier-FDMA (SC-FDMA) based uplink. The standard defines a number of RACH time/frequency channels to be used in the system. The UE randomly selects a RACH channel from the defined RACH channel set for the transmission of the preamble. In one embodiment of the present invention, during normal RACH access, the preamble may be selected by the UE from one of a set of available preambles.

According to some embodiments of the present invention, the counting request message may include the MBMS service ID, which the counting procedure may require as well as dedicated access information that is used for the counting response by the UEs. After receiving the counting request message, the UEs that are interested in receiving the particular MBMS service respond to the counting request by sending a counting response message using the allocated dedicated access.

According to one embodiment of the present invention the dedicated access information may take the form of a particular signature sequence that is to be used as a preamble sequence for non synchronised RACH access. Thus, in this embodiment, the counting response may simply be the transmission of the allocated dedicated signature sequence (i.e. the preamble part of the non-synchronised RACH). All interested UEs send the allocated signature sequence on an unsynchronised RACH preamble burst. This means that both idle and connected-state UEs use non-synchronised RACH for the counting response, thereby allowing the use of a common counting procedure for both idle and connected-state UEs.

The network controller receives the counting responses from the UEs. The reception of the signature sequence at the network controller would typically be implemented in the form of a correlating receiver. If energy is detected corresponding to the known signature sequence, this indicates that at least one user in the coverage area of the network controller is interested or activated the particular DIMS service.

In one embodiment of the present invention, the cellular network controller may be configured to identify a number of users or interested users of a broadcast service. In one embodiment of the present invention, the cellular network controller may be configured to identify who the users or interested users of a broadcast service are.

In one embodiment of the present invention, it is envisaged that the layer-1 response signal may be transmit to the cellular network controller, in response to the request message, to provide feedback to the cellular network controller that it is able to receive a particular signal quality level for the broadcast service, and therefore wishes to commence receiving the broadcast or continue to receive the broadcast. Thus, in one embodiment of the present invention, it is envisaged that a layer-1 response signal may be transmitted by the wireless subscriber communication unit in response to the request message if it is receiving too weak a signal to decode a subscribed-to broadcast service.

It is also envisaged that a feedback request and layer-1 response signal may be utilized when, say, a UE has subscribed to a broadcast service, but the quality of the service (or signal quality) is very low. Then it is beneficial for the UE to feed back this information to the cellular network controller. Thereafter, the cellular network controller may take some action to fix the problem, for example increase the transmit power.

It is also envisaged that in situations where the UE is receiving a good quality signal, and hence a good quality of service, the UE may not need to feed back this information to the cellular network controller, thereby saving valuable signaling resources.

Referring now to FIG. 5, a mechanism for the detection 500 of MBMS activated users, based on the counting response (that carries a signature sequence 510) at the network controller, is illustrated according to some embodiments of the present invention. The signature sequence 510 shows an example of a signature sequence transmitted over RACH preamble part.

The signal energy 522, 532 detected at the receiver at time intervals 524, 534, is illustrated in waveforms 520, 530. As shown in FIG. 5, the energy may take two forms of distribution with respect to time.

The energy distribution 526 shown in waveform 520 may result from a single user transmitting the signature sequence, there being a single transmission path between the transmitter and the receiver. Alternatively, the energy distribution 526 shown in waveform 520 may result from many users transmitting the signal, where the received signals all arrive at the receiver at the same time. The signal paths between the transmitters and the receiver may not be dispersive.

The energy distribution 536, 538, 540 shown in waveform 530 may result from a single user transmitting the signature sequence, where there are multi-path reflections (channel dispersion) between the transmitter and the receiver. Alternatively, the energy distribution 536, 538, 540 shown in waveform 530 may result from many users transmitting the signal, with the received versions of the signals arriving at the receiver at different times.

Even though, the number of users may not be decided accurately, this can detect whether at least one user has responded, based on the received signal strength of a signal received at the receiver. Thus, this provides a simple physical layer signalling-based method of detecting the presence (or not) of MEMS activated users in a cell.

As this method is based on the physical layer signalling, and does not require any higher layer information or user identification, the method does not require idle state UEs to establish a connection to the network for the MBMS counting response. This significantly reduces the amount of signalling required. In addition, this method requires the same response from UEs, regardless of their connection states to the network. Thus, this provides a common counting procedure for both idle and connected state UEs.

It is known that the signature sequences to be used in a wireless communication system are defined by the respective standard. The design of the signature sequence considers both the correlation properties of the sequences and the receiver complexity in decoding the signal. Thus, the number of sequences may be limited. Therefore, it may not be possible to dedicate a signature sequence for each MBMS service. According to one embodiment of the present invention, potential problems caused by the limited signature sequences can be resolved by time multiplexing of the same signature sequence between a number of MBMS services, as illustrated in FIG. 6. Thus, only one signature sequence is needed to be reserved for use as a counting response for all the MBMS services.

Referring now to FIG. 6, an example of time multiplexing of signature sequences 600 between a number of MBMS services is illustrated according to some embodiments of the present invention. At a first MBMS counting instance 610 ($T_1$), counting is required for MBMS service-1 615. The counting request for MBMS service n 625 is requested at counting instance 2 ($T_2$) 620 and counting request for service-3 635 is at counting instance 3 ($T_3$) 630, and so on. A skilled artisan will appreciate that the order of the counting request for MBMS service in FIG. 6 is provided as an example only. Notably, the counting instances may be scheduled for different MBMS services by the network controller. Thus, two MBMS services may not be requested at the same counting instance.

The UEs respond by sending the indicated signature sequence on a RACH preamble 640. The counting instances are designed to avoid the overlap of counting responses intended for different MBMS services. In particular, in one embodiment of the present invention, the gap between two consecutive counting instances is arranged to be large enough for all the UEs, which are interested of the service, to respond to the counting request, as illustrated in the respective counting instances 645, 650, 655. Therefore, the gap between the counting instances are arranged to be larger than the largest DRX length of a UE in the cell.

In one form, the signature sequence to be used for counting response may be included within the counting request message together with the MBMS service ID. In an alternative embodiment, only the MBMS service ID that required counting is sent over the counting request message. In this case, the signature sequence to be used should be broadcast over the BCCH or specified in the standard. In this manner, the signature sequence would be known by both the network and the UEs. Advantageously, this embodiment may reduce the number of information bits transmitted over MCCH.

Depending on the number of users interested in the MBMS service, the counting request may result in many users responding to the counting request on RACH at the same time. Thus, the signature sequence allocated for the counting response may arrive with excess energy at the network controller (i.e. an ENode-B); as compared to the energy of other RACH signatures selected by the users in a normal RACH access operation. The detection of signals may depend upon the receiver architecture, and a skilled artisan will appreciate that current advanced known receivers may resolve this problem are capable of detecting both high and low energy signature sequences.

However, in some receiver architectures, this may result in masking the low energy signal by the high energy signal. Thus, the detection of the RACH signatures that are used for normal RACH access may be blocked by the signature used for counting responses. In one embodiment of the present invention, one mechanism to resolve this is by controlling the RACH access for the counting response by introducing a probability factor.

Thus, according to another aspect of the present invention the access information takes form of a dedicated signature sequence and a probability factor. Here, in addition to the signature sequence, probability factor is included in the counting request message sent over MCCH. The probability factor is used for access control on RACH bursts, thus reducing the effect of MBMS counting responses on other users operating on the RACH.

In one embodiment of the present invention, a second mechanism may be employed to solve the aforementioned problem. This mechanism proposes to reserve certain RACH channel instances for MBMS responses. UEs wishing to send RACH for other purposes may be configured not to transmit on these particular RACH channel instances.

Thus, according to another embodiment of the present invention, the access information may take the form of a signature sequence and a RACH channel instance to use for the counting response. Here, in addition to the signature sequence, the RACH channel may be used for a counting response, and this may be included in the counting request message sent over the MCCH. This embodiment requires reserving part of the RACH resources (at least one RACH channel instance) for MBMS counting responses.

The dedicated RACH resources may be a sub-set of resources allocated for RACH preambles, as illustrated in FIG. 7. However, the dedicated RACH resource may be reserved for the allocation by the network controller in contrast to the selection by the UE in normal contention based RACH operation. The same preamble format may be used for both dedicated and contention based RACH access. The information on random access resources (RACH channels) may be, in some embodiments, broadcast over the broadcast control channel (BCCH), while the channel information of dedicated access channels is not broadcast in the cell. In some embodiments, this information may be transmitted to the UE together with the counting request message.

FIG. 7 illustrates a physical access resource pool 700 used in accordance with some embodiments of the present invention. If a pool of RACH physical resources 700 includes both dedicated access resources 710 and random access resources 715. The pool of RACH physical resources 700 is shared by a number of UEs (for both a counting response message and a normal RACH access); there is a possibility that the counting response sent by the users may be masked by the normal RACH access. Thus, even though there are some users in the cell that are interested in receiving the MEMS service, the network controller may not have any information of the interested UEs. Therefore, the service may not be provided in the cell.

One way to prevent this situation is to request that the UEs transmit the counting response until they are advised of the counting stop. The stop message may be formed as Layer-3 signalling and sent over the MCCH, as described later. Alternatively, the preamble could be acknowledged using Layer-1 signalling, as also described later.

In accordance with some embodiments of the present invention, the counting response from a single UE may be sufficient to influence the decision on the MBMS service provisioning in the cell. Therefore, as long as the network controller detects the signature sequence sent over the RACH preamble, the network controller sends an acknowledgment for the preamble in a downlink channel ether using a DL-SCH or preamble acknowledgment channel. All the UEs in the cell are able to receive and listen to this downlink acknowledgment. If the counting response is acknowledged, then the UEs stop their respective counting response procedure.

An unauthorised or fake UE may pretend that it is interested in receiving the MBMS service, and may thus respond to the counting request by sending the dedicated signature sequence over non-synchronised RACH. This may then force the network to provide the MBMS service in an empty cell. Even though the UE would not be able to decode the service, this results in radio resource waste (radio resource attack). It is envisaged that this scenario may be avoided by providing the dedicated access information only to the service activated users. One way to handle this is to encrypt or protect the dedicated access information with keys that are delivered to the UEs during the service activation procedure.

Referring now to FIG. 8, a signalling flow of the counting procedure 800 is illustrated, according to the present invention in a counting procedure. The signalling flow occurs between a UE 805 and an e-Node B (or network controller) 810. The network controller 810 makes a decision as to whether a counting procedure 800 is necessary for a given MBMS service. If the network controller 810 decides that a counting procedure 800 is needed, the network controller initiates the counting procedure by sending a counting request message on MCCH in step 815. The message includes an MEMS service ID, which the counting requires, and dedicated access information to be used for counting response.

The dedicated access information may include one or more of the following, as described in greater detail with respect to FIG. 10 to FIG. 12:
(i) A signature sequence to be used for non-synchronised RACH preamble access;
(ii) A signature sequence to be used for non-synchronised RACH preamble access and a probability factor to be used for RACH access control;
(iii) A signature sequence to be used for non-synchronised RACH preamble access and dedicated access resources (in terms of time-frequency) to be used for counting response.

After receiving the counting request message over MCCH in step 815, if the UE 805 is interested in the service provided, the UE 805 replies to the counting request 815 by sending a counting response message implicitly within a non-synchronised RACH preamble, in step 820. The UE 805 accesses the non-synchronised RACH burst with the dedicated signature sequence, which is signalled to the UE 805 within the counting request message for the given MBMS service. Therefore, the counting response is implicitly delivered to the network with the signature sequence.

It is noteworthy that counting request message is a Layer-3 (L3) message, whilst the counting response message is a Layer-1 (L1) message.

If the dedicated signature sequence is detected at the network controller 810, the network controller 810 sends an acknowledgement for the reception of the dedicated signature sequence' in a downlink channel. This acknowledgement may be interpreted as a counting stop message by the UEs, as shown in step 825.

Advantageously, as only Layer-1 signalling is involved, this also results in reduced signalling overhead in the downlink. It is envisaged, in some embodiments of the present invention, that the stop counting message 825 may also be sent to the UE 805 over the MCCH.

Referring now to FIG. 9, network controller behaviour 900 is illustrated in accordance with some embodiments of the present invention. The network controller behaviour 900 is illustrated with respect to a transmitter side operation 905 and a receiver side operation 910, with an RRM unit 920 spanning both operations. The process starts in step 915. The transmitter side of the RRM unit 920 makes decision for counting/re-counting for an MBMS service, as shown in step 925. If it is decided that a counting/re-counting process is to commence for a given MBMS service, the RRM unit 920 allocates dedicated access resources to be used for the counting response, as shown in step 930. In this manner, the service identifier (ID) of the given MBMS service and the dedicated access information are coded and transmitted over MCCH, as shown in step 935. The dedicated access information may take a form of a dedicated signature sequence and probability factor dedicated signature sequence and a dedicated RACH resources.

At the receiving side 910, the receiver at the network controller detects a dedicated signature sequence for an MBMS service, in step 940, which is used for the counting response by the UE. The result is passed on to the RRM 920, where a decision as to whether to deliver the MBMS service is made, as shown in step 945. The detection of the signature sequence at the network controller indicates that at least one user is interested in receiving the given MBMS service in the area covered by the network controller. Therefore, the service is delivered in the area covered by the network controller. If the signature sequence is not detected at the network controller, the service is not delivered in the cell.

If the dedicated signature is detected at the network controller, it sends an acknowledgment in a downlink channel, either over DL-SCH or a physical channel used for preamble acknowledgement, as shown in step 950.

It is envisaged that the RRM unit 920 may be either located at the network controller (i.e. an ENodeB) or elsewhere in the network, especially in cases that support multi-cell deployment scenarios.

FIG. 10 illustrates a flowchart 1000 of UE behaviour, in a case where the dedicated access information includes:
i) the signature sequence only, or
ii) signature sequence and dedicated RACH channel only,
in accordance with some embodiments of the present invention. The process starts in step 1005, with the UE reads MCCH 1010. If the UE is in idle mode, it wakes up at a time defined by the Discontinuous Reception (DRX) cycle. If the UE is required to perform counting for the MBMS services which it is interested in receiving, in step 1015, the UE performs the counting response by transmitting the dedicated signature sequence, which is informed to the UE within the MCCH. The counting response procedure then commences with incrementing a preamble transmission attempt counter at the UE in step 125.

If the counter is less than or equal to the maximum counter value, in step 1030, the signature is transmitted over the preamble part of the non-synchronised RACH in step 1040.

i). If only the signature sequence to be used is signalled with MCCH, the UE randomly selects the physical resource (from a plurality of RACH resources) for the transmission of counting response.

ii). If a RACH physical channel is to be used for the response, it is signalled to the UE over MCCH, the signature sequence is transmitted using the signalled RACH channel resources.

The UE waits for the preamble acknowledgment sent by the network controller, in step 1040. If the acknowledgment is received, in step 1045, the UE ends the counting response procedure in step 1055. If the acknowledgment is not received, in step 1045, the UE waits for the next RACH instance in step 1050 and re-sends the signature sequence on the RACH in step 1040.

FIG. 11 illustrates a flowchart 1100 of UE behaviour in a case where the dedicated access information includes the RACH channel resources only, in accordance with some embodiments of the present invention. In particular, the process starts in step 1105, with the UE reading the MCCH in step 1110. The UE then makes a decision as to whether to send a counting response, in step 1115. If the UE determines that it should not send a response, the process stop in step 1120.

However, if the UE determines that it should send a response, the UE selects a signature sequence from a set of signature sequences assigned to be used for RACH by the network. This information is normally defined by the network, and broadcast together with system information. The selected signature is sent over the signalled RACH channel within MCCH. After transmitting the signature sequence, the UE ends the procedure in step 1130. In this scenario, the RACH channel is dedicated to be used for a counting response. Hence, this may not result in a UE collision on the dedicated RACH channel. The network controller is not required to send a preamble acknowledgment in a downlink channel. Thus, the UE is not required to wait for the preamble acknowledgment.

Referring now to FIG. 12, a flowchart illustrates UE behaviour, in a case where dedicated access information includes signature sequence and a probability factor, in accordance with some embodiments of the present invention. The UE starts the procedure by reading the MCCH in step 1210. If the counting is required for the service which the UE is interested in, in step 1215, the UE starts the procedure by incrementing a preamble transmission counter kept locally at the UE, in step 1225.

If the counter is less than or equal to a pre-defined maximum value in step 1230, it checks for the probability conditions as shown in step 1240. If the transmission counter is larger than the maximum value, in step 1230, or there is no decision on a counting response in step 1215, the UE ends the procedure in step 1235 or step 1220 respectively.

However, if the probability condition is passed in step 1240 then the signature sequence is sent over a randomly selected non-synchronised RACH preamble in step 1250. If the probability checks failed in step 1240, the UE waits for the next RACH instance for the second (or subsequent) attempt in step 1245. The maximum value for the counter may be set to the number of RACH instances between two consecutive MCCH instances.

After sending the RACH preamble, the UE waits for the preamble acknowledgment sent by the network controller. If the acknowledgment is received in step 1255, the UE ends the procedure in step 1260. Otherwise, the UE waits for the next RACH instance in step 1245 and re-starts the RACH procedure in step 1225.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the inventive concept is described for use in E-UTRAN it is envisaged that the inventive concept is not restricted to this embodiment. It is contemplated that the inventive concept described herein may be applied whenever it is desired to detect interested or activated users for particular MBMS service in any cellular communication system.

It is envisaged that the aforementioned inventive concept aims to provide one or more of the following advantages:

(i) A Layer-1 (Physical Link Layer) signalling for the MBMS counting procedure.

(ii) One or more of the following advantages over the existing MBMS counting procedure in 3GPP:

a) A simple low complexity procedure to detect MBMS activated users in a cell.

b) A common procedure for both idle state UEs and connected state UEs.

c) The procedure creates only a very small amount of signalling traffic.

d) The procedure does not create a significant uplink load.

e) The procedure does not create congestion on RACH and does not affect other RACH users.

f) The procedure does not require idle state UEs to establish a connection to the network.

In this manner, a significant conservation in the battery life of the wireless subscriber communication unit can be achieved, when compared with, say, applying the same principal to a WCDMA network.

FIG. 13 illustrates a typical computing system 1300 that may be employed to implement processing functionality in embodiments of the invention. Computing systems of this type may be used in the NodeB (in particular, the scheduler of the NodeB), core network elements, such as the GGSN, and RNCs, for example. Those skilled in the relevant art will also recognize how to implement the invention using other computer systems or architectures. Computing system 1300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1300 can include one or more processors, such as a processor 1304. Processor 1304 can be implemented using a general or special purpose processing engine such as, for example, a microprocessor, microcontroller or other control logic. In this example, processor 1304 is connected to a bus 1302 or other communications medium.

Computing system 1300 can also include a main memory 1308, such as random access memory (RAM) or other dynamic memory, for storing information and instructions to be executed by processor 1304. Main memory 1308 also may be used for storing temporary variables or other intermediate information during execution of instructions to be executed by processor 1304. Computing system 1300 may likewise include a read only memory (ROM) or other static storage device coupled to bus 1302 for storing static information and instructions for processor 1304.

The computing system 1300 may also include information storage system 1310, which may include, for example, a media drive 1312 and a removable storage interface 1320. The media drive 1312 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1318 may include, for example, a hard disk, floppy disk, magnetic tape, optical disk, CD or DVD, or other fixed or removable medium that is read by and written to by media drive 1314. As these examples illustrate, the storage media 1318 may include a computer-readable storage medium having stored therein particular computer software or data.

In alternative embodiments, information storage system 1310 may include other similar components for allowing computer programs or other instructions or data to be loaded into computing system 1300. Such components may include, for example, a removable storage unit 1322 and an interface 1320, such as a program cartridge and cartridge interface, a removable memory (for example, a flash memory or other removable memory module) and memory slot, and other removable storage units 1322 and interfaces 1320 that allow software and data to be transferred from the removable storage unit 1318 to computing system 1300.

Computing system 1300 can also include a communications interface 1324. Communications interface 1324 can be used to allow software and data to be transferred between computing system 1300 and external devices. Examples of communications interface 1324 can include a modem, a network interface (such as an Ethernet or other NIC card), a communications port (such as for example, a universal serial bus (USB) port), a PCMCIA slot and card, etc. Software and data transferred via communications interface 1324 are in the form of signals which can be electronic, electromagnetic, and optical or other signals capable of being received by communications interface 1324. These signals are provided to communications interface 1324 via a channel 1328. This channel 1328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1308, storage device 1318, or storage unit 1322. These and other forms of computer-readable media may store one or more instructions for use by processor 1304, to cause the processor to perform specified operations. Such instructions, generally referred to as 'computer program code' (which may be grouped in the form of computer programs or other groupings), when executed, enable the computing system 1300 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1300 using, for example, removable storage drive 1314, drive 1312 or communications interface 1324. The control logic (in this example, software instructions or computer program code), when executed by the processor 1304, causes the processor 1304 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any

The invention claimed is:

1. A cellular network infrastructure equipment comprising:
a transceiver; and
processing logic operably coupled to the transceiver and arranged to transmit a request message to one or more wireless subscriber communication unit(s), wherein the request message comprises a multi-cast service identifier for a multi-cast service as well as an indication of a dedicated signature sequence to be used for a random access channel (RACH) preamble by the one or more wireless subscriber communication unit(s) for responding to the request message; wherein:
the transceiver is arranged to receive and process a response signal from a particular communication cell using a physical non-synchronized random access channel (RACH) in response to the request message, wherein said response signal is a RACH preamble comprising the dedicated signature sequence for the multi-cast service, and in response thereto performs at least one of the following:
(i) entering a point-to-multipoint broadcast mode of operation; and
(ii) modifying a delivery of the multi-cast service in that communication cell.

2. The cellular network infrastructure equipment of claim 1 wherein the request message is transmitted by the network infrastructure equipment to identify whether one or more wireless subscriber communication unit(s) is receiving the multi-cast service.

3. The cellular network infrastructure equipment of claim 2 wherein the response signal is received from a wireless subscriber communication unit in response to the request message if the wireless subscriber communication unit is not successfully able to decode a subscribed to multi-cast service.

4. The cellular network infrastructure equipment of claim 1 wherein the request message is transmitted by the network infrastructure equipment to identify whether one or more wireless subscriber communication unit(s) is interested in receiving a multi-cast service.

5. The cellular network infrastructure equipment of claim 4 wherein the response signal is received from a wireless subscriber communication unit in response to the request message if the wireless subscriber communication unit is interested in receiving the multi-cast service.

6. The cellular network infrastructure equipment of claim 1 wherein the at least one network infrastructure equipment transmits a request message requesting a wireless subscriber communication unit to indicate an interest in receiving a Multimedia Multicast/Multi-case Service (MBMS).

7. The cellular network infrastructure equipment of claim 1 wherein the network infrastructure equipment transmits the request message comprising dedicated access information comprising a probability factor and an indication of a non-synchronous RACH on which a wireless subscriber unit is to transmit the response signal in response to the request message.

8. The cellular network infrastructure equipment of claim 7 wherein the dedicated access information is encrypted or protected such that only a wireless subscriber communication unit interested in the multi-cast service is able receive the dedicated access information.

9. The cellular network infrastructure equipment of claim 1 wherein the network infrastructure equipment transmits an acknowledgment in response to receiving the response signal.

10. The cellular network infrastructure equipment of claim 1 further comprising time multiplexing a plurality of multiple response signals between a plurality of multi-cast services.

11. The cellular network infrastructure equipment of claim 1 wherein the communication system is an Orthogonal Frequency Division Multiple Access (OFDMA) based Evolved-UTRAN cellular communication system.

12. A wireless subscriber communication unit comprising:
a transceiver arranged to receive a request message from a network infrastructure equipment, wherein the request message comprises a multi-cast service identifier for a multi-cast service as well as an indication of a dedicated signature sequence to be used for a random access channel (RACH) preamble by the wireless subscriber communication unit for responding to the request message; and
processing logic operably coupled to the transceiver and arranged to process the request message, wherein:
the transceiver is arranged to transmit a response signal using a physical non-synchronized random access channel (RACH) in response to the request message, wherein said response signal is a RACH preamble comprising the dedicated signature sequence for the multi-cast service, and receive a multi-cast transmission in response to the transmission of the response signal.

13. The wireless subscriber communication unit of claim 12 wherein the response signal is transmitted by the wireless subscriber communication unit in response to the request message if the wireless subscriber communication unit is not successfully able to decode a subscribed-to multi-cast service.

14. The wireless subscriber communication unit of claim 12 wherein the response signal is transmitted by the wireless subscriber communication unit in response to the request message if the wireless subscriber communication unit is interested in receiving the multi-cast service.

15. The wireless subscriber communication unit of claim 14 wherein the wireless subscriber communication unit transmits the response signal to indicate an interest in receiving a Multimedia Multicast/Multi-case Service (MBMS).

16. The wireless subscriber communication unit of claim 12 wherein the transceiver transmits the response signal on a dedicated access resource indicated in the request message.

17. The wireless subscriber communication unit of claim 16 wherein the dedicated access resource comprises a signature sequence and an indication of a non-synchronous random access channel (RACH) resource to be used for the response message related to a particular Multimedia Broadcast and Multicast Service.

18. The wireless subscriber communication unit of claim 16 wherein the dedicated access information comprises a dedicated signature sequence to be used for a counting response.

19. The wireless subscriber communication unit of claim 16 wherein the dedicated access information comprises a probability factor received from the network infrastructure equipment in the request message and the wireless subscriber communication unit selects a non-synchronous RACH on which to transmit the response signal in response thereto.

20. The wireless subscriber communication unit of claim 16 wherein the dedicated access information is encrypted or protected such that only a wireless subscriber communication unit interested in the multi-cast service is able receive the dedicated access information.

21. The wireless subscriber communication unit of claim 12 wherein the transceiver transmits the response signal on a non-synchronous RACH randomly selected from a set of specified RACH resources.

22. The wireless subscriber communication unit of claim 12 wherein the wireless subscriber communication unit receives an acknowledgment from the network infrastructure equipment in response to receiving the response signal.

23. The wireless subscriber communication unit of claim 12 further comprising time multiplexing a plurality of multiple response signals between a plurality of multi-cast services.

24. The wireless subscriber communication unit of claim 12 wherein the response signal is transmitted by the wireless subscriber communication unit in response to the request message if the wireless subscriber communication unit is not successfully able to decode a subscribed-to multi-cast service.

25. The wireless subscriber communication unit of claim 12 wherein the wireless subscriber communication unit is part of an Orthogonal Frequency Division Multiple Access (OFDMA) based Evolved-UTRAN cellular communication system.

26. A network infrastructure equipment for a cellular communication system arranged to obtain feedback from one or more wireless subscriber communication unit(s) related to a multi-cast service, the network infrastructure equipment comprising logic comprising executable program code, the program code operable to cause the network infrastructure equipment to perform:
transmitting a request message to one or more wireless subscriber communication unit(s), wherein the request message comprises a multi-cast service identifier for the multi-cast service as well as an indication of a dedicated signature sequence to be used for a random access channel (RACH) preamble by the one or more wireless subscriber communication unit(s) for responding to the request message; and
detecting by the network infrastructure equipment a response signal in a particular communication cell using a physical a non-synchronized random access channel (RACH), wherein said response signal is a RACH preamble comprising the dedicated signature sequence for the multi-cast service, and in response thereto performing at least one of the following:
(i) entering a point-to-multipoint multi-cast mode of operation; and
(ii) modifying a delivery of the multi-cast service in that communication cell.

27. A non-transitory computer readable storage medium including computer executable instructions, wherein the instructions, when executed by a network infrastructure equipment, cause the network infrastructure equipment to perform a method for obtaining feedback from one or more wireless subscriber communication unit(s) related to a multi-cast service, the method comprising:
transmitting a request message to one or more wireless subscriber communication unit(s), wherein the request message comprises a multi-cast service identifier for the multi-cast service as well as an indication of a dedicated signature sequence to be used for a random access channel (RACH) preamble by the one or more wireless subscriber communication unit(s) for responding to the request message; and
detecting by the network infrastructure equipment a response signal in a particular communication cell using a physical non-synchronized random access channel (RACH), wherein said response signal is a RACH preamble comprising the dedicated signature sequence for the multi-cast service, and in response thereto entering a point-to-multipoint broadcast mode of operation for the multi-cast service in that communication cell.

28. A non-transitory computer readable storage medium including computer executable instructions, wherein the instructions, when executed by a wireless subscriber communication unit, cause the wireless subscriber communication unit to perform a method for receiving a multi-cast service, the method comprising:
receiving and processing a request message, wherein the request message comprises a multi-cast service identifier for the multi-cast service as well as an indication of a dedicated signature sequence to be used for a random access channel (RACH) preamble by the wireless subscriber communication unit for responding to the request message;
transmitting a response signal using a physical non-synchronized random access channel (RACH) in response to the request message, wherein said response signal is a RACH preamble comprising the dedicated signature sequence for the multi-cast service if the wireless subscriber communication unit is interested in receiving the multi-cast service;
transmitting, alternatively, the response signal in response to the request message if a wireless subscriber communication unit is not successfully able to decode a subscribed-to multi-cast service; and
receiving the multi-cast service.

* * * * *